United States Patent
Hong et al.

(10) Patent No.: US 12,252,196 B2
(45) Date of Patent: Mar. 18, 2025

(54) METHOD AND DEVICE FOR GENERATING STEERING WHEEL REACTION TORQUE SIGNAL IN SBW SYSTEM, AND SBW STEERING SYSTEM WITH THE SAME

(71) Applicant: HL Mando Corporation, Pyeongtaek-si (KR)

(72) Inventors: Seunggyu Hong, Seongnam-si (KR); Seong Joo Kim, Seoul (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 628 days.

(21) Appl. No.: 17/360,158

(22) Filed: Jun. 28, 2021

(65) Prior Publication Data
US 2021/0403085 A1    Dec. 30, 2021

(30) Foreign Application Priority Data

Jun. 29, 2020    (KR) .................. 10-2020-0079255

(51) Int. Cl.
*B62D 6/00*    (2006.01)
*B62D 5/04*    (2006.01)
*B62D 6/10*    (2006.01)

(52) U.S. Cl.
CPC ........... *B62D 6/008* (2013.01); *B62D 5/0463* (2013.01); *B62D 6/10* (2013.01)

(58) Field of Classification Search
CPC ........ B62D 6/008; B62D 5/0463; B62D 6/10; B62D 5/0472; B62D 6/00; B62D 15/00; B60Y 2400/3032
See application file for complete search history.

(56) References Cited

U.S. PATENT DOCUMENTS

2002/0107621 A1*   8/2002   Byers .................... B62D 6/008
                                                              180/443
2005/0205339 A1*   9/2005   Aizawa .............. B60W 30/045
                                                              180/443
(Continued)

FOREIGN PATENT DOCUMENTS

DE        102017213415 A1 *   2/2019    ........... B62D 5/0472
DE    10 2018 128 452 A1      5/2019

OTHER PUBLICATIONS

Samuel Markings, How to Calculate Wheel Speed, 2018, sciencing.com, pp. 1-3 (Year: 2018).*
(Continued)

*Primary Examiner* — Aniss Chad
*Assistant Examiner* — Chase L Cooley
(74) *Attorney, Agent, or Firm* — Hauptman Ham, LLP

(57) ABSTRACT

The present disclosure relates to a device and method for generating steering reaction torque. In providing a reaction torque to a steering wheel of a steer-by-wire steering system, the device may determine a target frequency according to the rotational speed of the wheel, generate a filtered rack force signal excluding a cutoff band including the target frequency from the rack force signal, generate a target reaction torque signal based on the filtered rack force signal, and generate the reaction torque based on the target reaction torque signal. Therefore, it is possible to improve the steering feeling of the SBW steering system by providing the steering wheel with reaction torque from which unnecessary vibration components such as shimmy and judder are removed.

11 Claims, 10 Drawing Sheets

(56) References Cited

U.S. PATENT DOCUMENTS

| | | | |
|---|---|---|---|
| 2015/0151743 A1* | 6/2015 | Saito | B60W 30/19 701/99 |
| 2016/0280252 A1* | 9/2016 | Tagami | B62D 5/0421 |
| 2019/0144031 A1 | 5/2019 | Bremkens et al. | |
| 2019/0185050 A1 | 6/2019 | Lee et al. | |
| 2021/0354750 A1* | 11/2021 | Kim | B62D 6/008 |

OTHER PUBLICATIONS

Communication issued Aug. 8, 2023 for counterpart German Patent Application No. 10 2021 206 743.3.
Office Action dated Dec. 8, 2024 for corresponding Chinese Patent Application No. 202110728109.7, along with an English machine translation (28 pages).

* cited by examiner

FIG.5
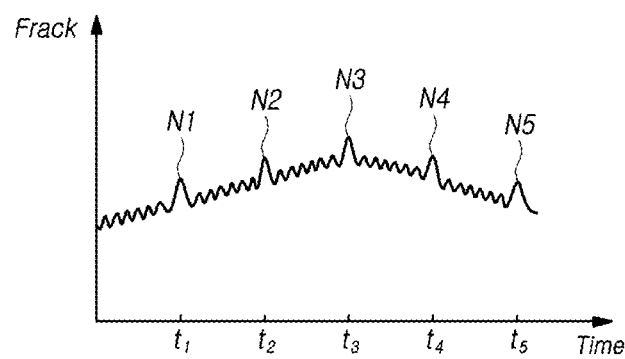
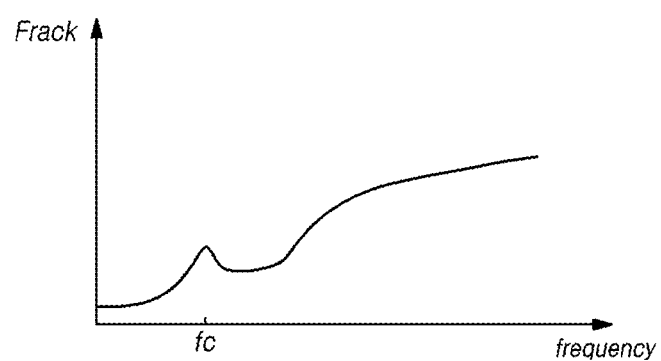

FIG.6
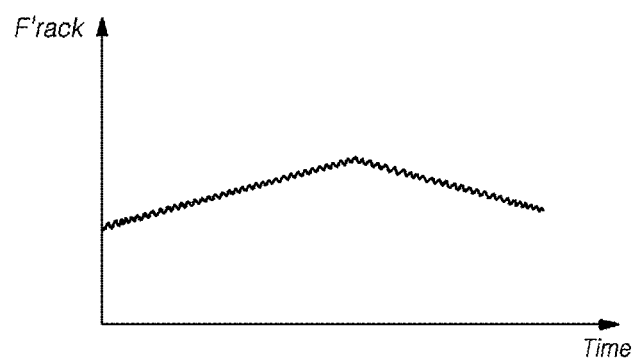
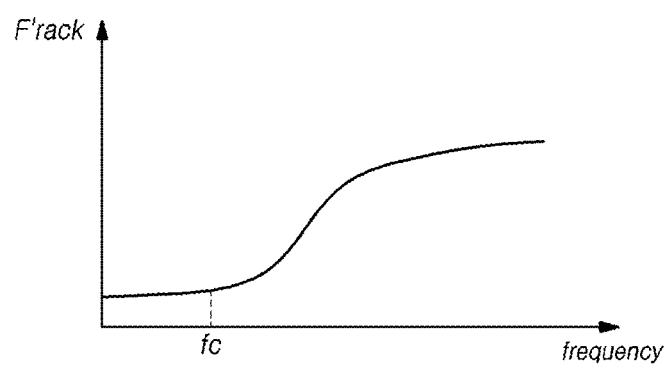

METHOD AND DEVICE FOR GENERATING STEERING WHEEL REACTION TORQUE SIGNAL IN SBW SYSTEM, AND SBW STEERING SYSTEM WITH THE SAME

CROSS REFERENCE TO RELATED APPLICATION

This application claims priority from Korean Patent Application No. 10-2020-0079255, filed on Jun. 29, 2020, which is hereby incorporated by reference for all purposes as if fully set forth herein.

TECHNICAL FIELD

An embodiment of the present disclosure relates to a device and method for generating steering wheel reaction torque, more particularly, to a device and method for generating a steering reaction torque from which unnecessary vibration components are removed based on wheel rotation speed and rack force in a steer-by-wire steering system.

BACKGROUND

A steer-by-wire (SBW) steering system of a vehicle refers to a system that uses an electric motor such as a motor to steer a vehicle instead of removing a mechanical connection device such as a steering column or universal joint or pinion shaft between the steering wheel and the wheel.

The SBW system generally includes an upper stage device, a lower stage device, and a control device for controlling the same. The upper stage device may include a torque detection unit connected to a steering wheel to detect torque applied to the steering wheel, and a steering feedback actuator (SFA) as a motor device to provide reaction torque to the steering wheel according to steering through the lower rack bar.

In addition, the lower stage device may generate a steering assist torque signal proportional to the steering torque applied to the steering wheel, and may control a driving motor or a driving actuator that drives a pinion gear or a ball nut mechanism for moving a rack bar connected to a tie rod of a wheel to the left and right using the steering assist torque signal.

This SBW may independently operate without a mechanical connection between the upper stage unit including the steering wheel, steering column and SFA, and the lower stage unit including the rack bar driving unit (pinion gear, ball nut and steering motor for driving the same).

Therefore, it is necessary to make the driver feel steering feeling by rotating the steering wheel connected to the upper stage device according to the movement of the rack bar of the lower stage device in which the actual steering is performed. For this purpose, a force or torque applied to the steering wheel may be defined as a reaction force or a reaction torque.

Meanwhile, during vehicle travels, vibrations may occur in the front wheel tires during low-speed or high-speed driving due to wheel unbalance, poor uniformity, or resonance with the suspension, which may be generally referred to as a shimmy or shimmy vibration.

In addition, during shifting or braking of a vehicle, vibration may occur according to a change in braking force on the friction surface of the friction clutch or brake, and this may be referred to as a judder or a judder vibration.

Meanwhile, when providing a reaction force to the steering wheel using the SFA, it may be preferable to provide a reaction torque to the steering wheel according to normal steering or to provide an appropriate reaction torque to the steering wheel according to a change in rack force according to an external input such as a road surface. However, it is not necessary to reflect a rack force change due to the shimmy or judder vibration as described above in the reaction torque.

That is, in the case that the SBW system provides a reaction force to the steering wheel, it is necessary to include information on the road surface but remove unnecessary information such as shimmy and judder.

SUMMARY

In this background, an aspect of the present disclosure is to provide a device and method for providing a reaction torque to a steering wheel in a steer-by-wire (SBW) steering system.

Another aspect of the present disclosure is to provide a device and method capable of providing a reaction torque to the steering wheel from which unnecessary vibration components such as shimmy and judder are removed in the SBW steering system.

Another aspect of the present disclosure is to provide a device and method capable of improving the feeling of feedback torque or reaction torque provided to the steering wheel in an SBW steering system by attenuating a specific cutoff frequency band among the rack force signals based on the rotational speed of the wheel to calculate the reaction torque.

Another aspect of the present disclosure is to provide a device and method capable of, in providing a reaction torque to a steering wheel in SBW system, providing the steering wheel with a reaction torque from which unnecessary vibration components such as shimmy and judder are removed to improve the steering feeling of the SBW steering system by determining a target frequency according to the rotational speed of the wheel, generating a filtered rack force signal excluding a cutoff band including the target frequency from the rack force signal, generating a target reaction torque signal based on the filtered rack force signal, and generating the reaction torque based on the target reaction torque signal.

In accordance with an aspect of the present disclosure, there is provided with a device for generating a steering reaction torque signal in a steer-by-wire steering system of a vehicle. The device may include a target frequency determiner for determining a target frequency based on a rotational speed of a wheel, a rack force signal processor for generating a filtered rack force signal excluding a cutoff band including the target frequency from a rack force signal of the vehicle, a target reaction torque determiner for determining a target reaction torque based on the filtered rack force signal, and a reaction torque signal generator for generating a steering reaction torque signal based on the target reaction torque.

In this case, the target frequency may be determined as the number of rotation per second of the wheel or a multiple of the number. Alternatively, the target frequency may be determined as a value obtained by dividing a moving distance per second of the vehicle by (n x wheel diameter) or a multiple of the value.

In addition, the target frequency determination, the filtered rack force signal generation, the target reaction torque determination and the steering reaction torque signal generation may be performed only if a brake pedal operation is detected.

The rack force signal processor may include a notch filter for generating the filtered rack force signal excluding the cutoff band.

The rack force signal may be determined based on a steering torque applied to a steering column of the vehicle and a motor torque of a driving motor for moving a rack bar of the SBW system.

In accordance with another aspect of the present disclosure, there is provided a steer-by-wire steering system including a wheel rotation sensor for detecting a rotational speed of a wheel, a reaction torque signal generating device configuring to determine a target frequency based on the rotational speed of the wheel, generate a filtered rack force signal excluding a cutoff band including the target frequency from a rack force signal, and generate a steering reaction torque signal according to a target reaction torque determined based on the filtered rack force signal, and a steering feedback actuator for providing a reaction torque to a steering wheel according to the steering reaction torque signal.

In addition, in accordance with another aspect of the present disclosure, there is provided a method for generating a steering reaction torque signal in a steer-by-wire steering system of a vehicle. The method may include determining a target frequency based on a rotational speed of a wheel, generating a filtered rack force signal excluding a cutoff band including the target frequency from a rack force signal of the vehicle, determining a target reaction torque based on the filtered rack force signal, and generating a steering reaction torque signal based on the target reaction torque.

According to embodiments of the present disclosure, it is possible to provide a reaction torque to the steering wheel from which unnecessary vibration components such as shimmy and judder are removed in the SBW steering system.

In addition, according to embodiments of the present disclosure, it is possible to improve the feeling of feedback torque or reaction torque provided to the steering wheel in an SBW steering system by attenuating a specific cutoff frequency band among the rack force signals based on the rotational speed of the wheel to calculate the reaction torque.

In addition, according to embodiments of the present disclosure, it is possible to, in providing a reaction torque to a steering wheel in SBW system, provide the steering wheel with a reaction torque from which unnecessary vibration components such as shimmy and judder are removed to improve the steering feeling of the SBW steering system by determining a target frequency according to the rotational speed of the wheel, generating a filtered rack force signal excluding a cutoff band including the target frequency from the rack force signal, generating a target reaction torque signal based on the filtered rack force signal, and generating the reaction torque based on the target reaction torque signal.

BRIEF DESCRIPTION OF THE DRAWINGS

FIG. 5 illustrates an example of a rack force signal including a noise component according to the present embodiment.

FIG. 6 illustrates an example of a filtered rack force signal from which a cutoff band is removed according to the present embodiment.

DETAILED DESCRIPTION

Figure 1:
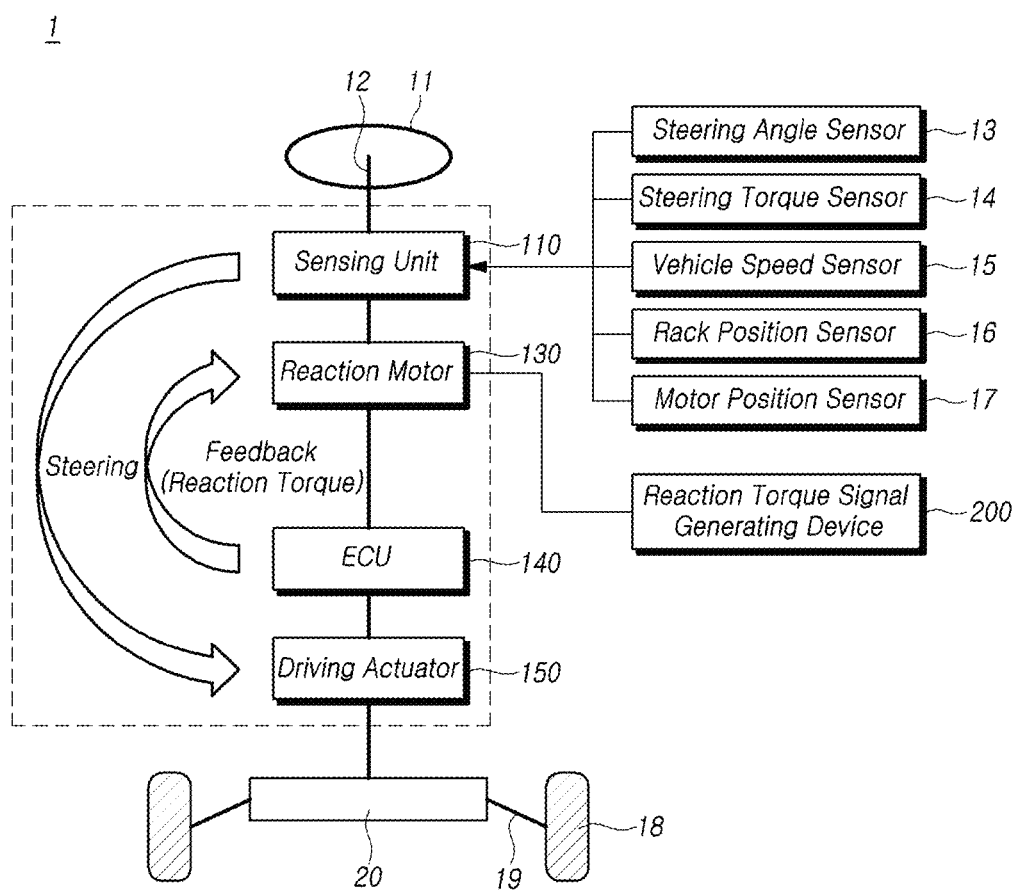
FIG. 1 illustrates a configuration of an SBW system in which the steering reaction torque signal generating device according to the present embodiment can be used.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Hereinafter, the embodiment will be described in detail with reference to the drawings.

FIG. 1 illustrates a configuration of an SBW system in which the steering reaction torque signal generating device according to the present embodiment can be used.

As shown in FIG. 1, an SBW system including a steering reaction torque signal generating device according to the present embodiment may include a steering wheel 11, a steering column 12 for supporting the steering wheel, a reaction motor 130 mounted on one side of the steering column 12 and driven by a reaction torque signal generating device 200 and the ECU 140 according to the present embodiment, a sensing unit 110 positioned at one side of the steering shaft 12, the reaction motor 130 or a rack bar 20 to detect steering-related information and rack position information, an electronic control unit (ECU) 140 generating control signals for a steering reaction torque and steering assist force through an assist current control map based on vehicle speed information, and one or more driving motors or driving actuators 150 that independently steer each of the left and right wheels 18 of the vehicle according to a control signal of the ECU.

In this SBW steering system, the reaction motor 130 and a steering torque sensor 14 and a steering angle sensor 13 mounted on the steering column may be expressed as a steering feedback actuator (SFA) device constituting the upper stage of the SBW system. The driving motor or a driving actuator 150 for driving the rack bar 20 may be expressed as a road wheel actuator (RWA) device constituting a lower stage of the SBW system.

In addition, in a SBW system 1 of a rack-and-pinion type, the steering torque generated by the rotation of the steering wheel 11 may be transmitted to the rack bar 20 through the rack-and-pinion mechanism, and steering assist force generated by the driving actuator 150 may be transmitted to the left wheel and the right wheel 18 through the tie rod 19 and the rack bar 109.

The sensing unit 110 may include at least one sensor of a steering angle sensor 13 detecting a change in rotation of the steering column 12 that is changed according to the driver's manipulation of the steering wheel 11, a torque sensor 14 installed on one side of the reaction motor 130 and the steering column 12 to detect a steering torque applied to the steering column or a reaction torque output from the reaction motor 130, a vehicle speed sensor 15 for detecting the vehicle speed of the vehicle, a rack position sensor 16 positioned on the rack bar 20 to detect rack position information, and a motor position sensor 17 for detecting the position of the motor rotor of the driving actuator 150 or the reaction motor 130. Alternatively, the sensing unit 110 may receive sensing information from the sensors.

In addition, the sensing unit 110 may further include a wheel rotation speed sensor 18 for detecting a rotational speed of the wheel used in the reaction torque signal generating device 200 according to the present embodiment.

Alternatively, as will be described below, the wheel rotation speed sensor 18 may be not used, and, in this case, the rotational speed of the wheel may be determined based on the vehicle speed information from the vehicle speed sensor 15.

The reaction motor 130 may be installed on one side of the steering column 12. The reaction motor 130 is a motor for generating the steering reaction force against the driver's steering force applied to the steering wheel 11 according to a control signal from the reaction torque signal generating device 200 or the ECU 140 of the present embodiment.

Specifically, based on the sensing information sensed by the sensing unit 110, the reaction torque signal generating device 200 may generate reaction torque control information as described below to drive the reaction motor 130. The ECU 140 may generate the steering assistance control signal using an assist current control map and move the rack bar 20 to the left or right through the driving actuator 150 based thereon.

An R-EPS (Rack-type EPS) has been illustrated and described as the SBW system in FIG. 1, however, hydraulic EPS, C-EPS (Column-type EPS), DP-EPS (Dual-pinion-type EPS), etc. may be used.

Meanwhile, this SBW may independently operate without a mechanical connection between the upper stage unit including the steering wheel, steering column and SFA, and the lower stage unit including the rack bar driving unit (pinion gear, ball nut and steering motor for driving the same).

Therefore, it is necessary to make the driver feel steering feeling by rotating the steering wheel connected to the upper stage device according to the movement of the rack bar of the lower stage device in which the actual steering is performed. For this purpose, a force or torque applied to the steering wheel may be defined as a reaction force or a reaction torque.

Meanwhile, during vehicle travels, vibrations may occur in the front wheel tires during low-speed or high-speed driving due to wheel unbalance, poor uniformity, or resonance with the suspension, which may be generally referred to as a shimmy or shimmy vibration.

In addition, during shifting or braking of a vehicle, vibration may occur according to a change in braking force on the friction surface of the friction clutch or brake, and this may be referred to as a judder or a judder vibration.

Meanwhile, when providing a reaction force to the steering wheel using the SFA, it may be preferable to provide a reaction torque to the steering wheel according to normal steering or to provide an appropriate reaction torque to the steering wheel according to a change in rack force according to an external input such as a road surface. However, it is not necessary to reflect a rack force change due to the shimmy or judder vibration as described above in the reaction torque.

That is, in the case that the SBW system provides a reaction force to the steering wheel, it is necessary to include information on the road surface but remove unnecessary information such as shimmy and judder.

For this purpose, there may be used a low-pass filter (LPF) for noise component signal processing among low-end information of SBW system, or a filter for filtering a signal of a specific frequency band to avoid hardware resonance.

However, in the case of using this method, it is possible to remove a certain component of a noise component or an unnecessary signal component, but it is impossible to remove a noise having a frequency that varies depending on the situation of the vehicle. In particular, in the case that a low-pass filter (LPF) removing a low-frequency signal component is used, there is a problem in that necessary information to be reflected in providing a reaction force is also removed.

Accordingly, in the present embodiment, there may suggest a manner for improving the feeling of the reaction torque provided to the steering wheel in the SBW steering system attenuating a certain cutoff frequency band among the rack force signals based on the rotational speed of the wheel. In this specification, the reaction torque may be used with the same meaning as a feedback torque or a reaction force torque, etc.

Figure 2:
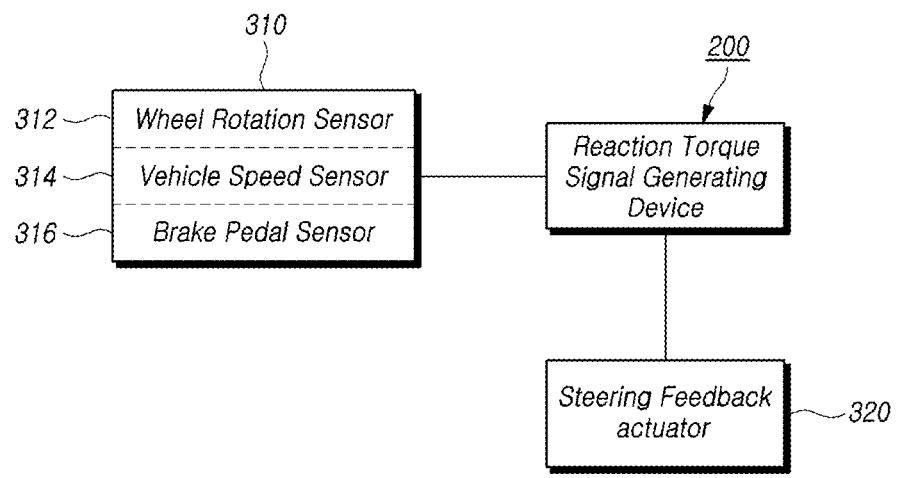
FIG. 2 is a functional block diagram of a SBW system including a steering reaction torque signal generating device according to the present embodiment.

FIG. 2 is a functional block diagram of a SBW system including a steering reaction torque signal generating device according to the present embodiment.

The SBW system according to the present embodiment may include a sensing unit 310 including a wheel rotation sensor 312, a reaction torque signal generating device 200 for generating a target reaction torque and a steering reaction torque signal based on a filtered rack force signal according to the present embodiment, and a steering feedback driving unit (SFA) 320 for providing a feedback force, that is, a reaction torque, to the steering wheel based on the reaction torque signal generated by the reaction torque generating signal device.

In addition, although not shown, the SBW system according to the present embodiment may further include a driving gear unit connected to the rack bar, a road wheel actuator (RWA) including a driving motor for controlling the movement of the rack bar, and an ECU as a control unit that generates a steering assistance signal according to the steering torque applied to the steering wheel to control the road wheel actuator, and controls the steering feedback driving unit based on the generated reaction torque signal.

Further, in addition to or instead of the wheel rotation sensor 312, the sensing unit 310 may further include a vehicle speed sensor 314.

In this embodiment, the reaction torque is controlled based on the wheel rotation speed or the number of rotations per unit time of the wheel, and the rotational speed of the wheel may be directly measured using the wheel rotation sensor, or may be estimated based on the vehicle speed information measured by the vehicle speed sensor.

In addition, the sensing unit 310 of this embodiment may further include a brake pedal sensor 316, and only when the operation of the brake pedal is detected by the brake pedal sensor 316, the reaction torque signal generating device may be activated.

The steering feedback driving unit (SFA) 320 may mean a mechanism and an electronic device that provides a reaction force to the steering wheel based on a reaction torque signal generated by the reaction torque signal generating device, and may include a power transmission mechanism connected to the steering column and a reaction motor for rotating a part of the power transmission mechanism.

In this case, as an example of the power transmission mechanism, there may be used a worm-worm wheel gear mechanism shaft including a worm shaft connected to the reaction motor shaft and a worm wheel connected to the steering column.

However, the power transmission mechanism of the SFA 320 is not limited thereto, and there may be used a belt-pulley type power transmission mechanism including a driving pulley and a driven pulley connected to the reaction motor shaft and the steering column, respectively, and a belt disposed between the pulleys.

Figure 3:
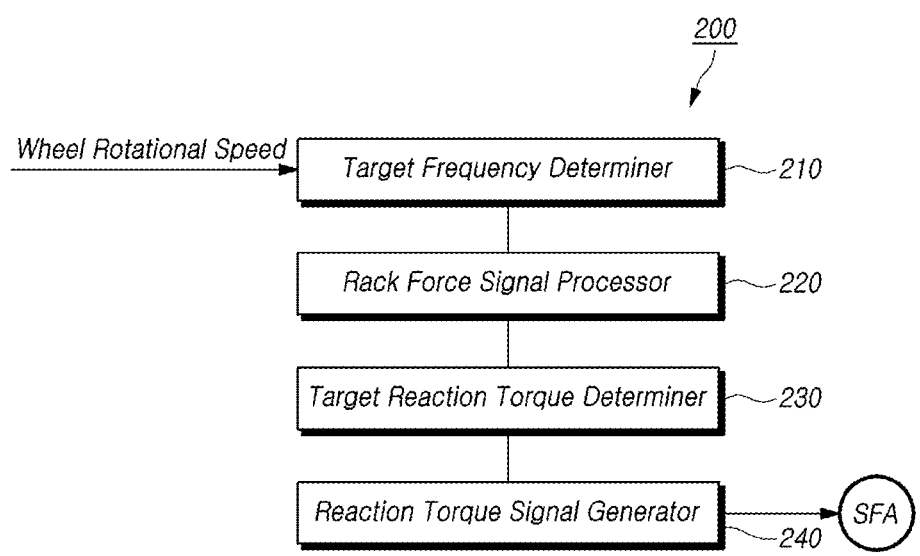
FIG. 3 is a configuration diagram illustrating the components of a steering reaction torque signal generating device according to the present embodiment.

FIG. 3 is a configuration diagram illustrating the components of a steering reaction torque signal generating device according to the present embodiment.

Referring to FIG. 3, the steering reaction torque signal generating device 200 according to the present embodiment may include a target frequency determiner 210, a rack force signal processor 220, a target reaction torque determiner 230, and a reaction torque signal generator 240.

The target frequency determiner 210 may determine a target frequency fc based on wheel rotation speed information that may be measured from the wheel rotation sensor 312 or calculated from information of the vehicle speed sensor.

In this case, the target frequency fc may mean a center frequency of a cutoff band, which is a band to be removed among rack force signals.

The target frequency fc may be determined as the number of rotation per unit time (e.g., second) of the front or rear wheels of the vehicle or a multiple thereof.

Alternatively, the target frequency may be determined as a value obtained by dividing the moving distance per unit time (e.g., second) of the vehicle by ($\pi \times$wheel diameter) or a multiple thereof.

That is, the target frequency fc may be directly determined from the rotational speed of the wheel measured by the wheel rotation sensor 312 or may be indirectly calculated from the vehicle speed per second measured by the vehicle speed sensor 314.

For example, if the rotational speed of the wheel is 30 rpm (rotation per minute), the target frequency fc may be determined as 30/60, that is, 0.5 Hz.

In the present embodiment, the noise component to be removed when providing the reaction torque may include a shimmy noise or a judder noise.

The shimmy noise may be highly likely to be generated by the rotation of the wheel, in particular, by resonance with the rotation speed of the wheel.

In addition, the judder noise may occur according to a change in braking force on a friction surface of a friction clutch or brake during shifting or braking, and such judder noise may also be related to the rotational speed of a wheel on which the brake device is disposed.

Therefore, in the present embodiment, in order to remove a noise component corresponding to the rotational speed of the wheel when providing the reaction torque to the steering wheel in the SBW system, there may provide a configuration in which a predetermined cutoff band among the rack force signal is removed and then the reaction torque is determined based thereon.

In a general electric steering device, since the rack bar is directly connected to the steering column through a pinion gear, a shimmy vibration or judder vibration may be directly transmitted to the steering wheel.

Therefore, in the conventional electric steering system, there has been used a method of determining the assistance steering force by directly measuring or estimating the shimmy vibration or judder vibration.

However, in the SBW steering system to which this embodiment can be applied, since the RWA device for driving the rack bar and the SFA device connected to the steering wheel are mechanically separated, it is difficult to apply the technology for removing the shimmy vibration or the judder vibration of the general electric steering device.

Therefore, in the present embodiment, there provides a manner in which the shimmy or judder noise can be effectively attenuated in the SBW system by removing a part of the rack force signals used for calculating the reaction torque based on the wheel rotation speed and generating the steering wheel reaction torque based thereon.

The rack force signal processor 220 may perform an operation for generating a filtered rack force signal excluding a cutoff band including the target frequency fc from a rack force signal of the vehicle.

The rack force signal processor 220 may be implemented using a notch filter designed to have a target frequency fc and a specific margin frequency $\Delta f$ on both sides of the target frequency fc.

The notch filter is used to remove a rack force component corresponding to the shimmy/judder noise component from a measured or estimated rack force signal. In this case, the margin frequency $\Delta f$ may be appropriately set as a tuning parameter according to the precision of the required reaction torque.

That is, as the margin frequency $\Delta f$ is increased, a lot of the feeling due to the shimmy/judder noise may be removed, and as the margin frequency is set to be small, noise may be less removed.

Accordingly, if the frequency band of the noise component detected in the estimated rack force signal is large, the margin frequency may be set higher.

In addition, according to a selection of the driver, etc., the margin frequency may be set high in the quiet mode for minimizing the feeling caused by external influences, and conversely, may be set low in the dynamic mode for dynamically feeling the steering feeling caused by external influences.

Meanwhile, the rack force signal according to the present embodiment may be estimated based on a steering torque applied to the steering column of the vehicle, a motor torque of the driving motor for moving the rack bar of the SBW system, an angle of the pinion gear, and the like.

It will be described a manner of determining the rack force signal in more detail below with reference to FIG. 5.

Meanwhile, the target reaction torque determiner 230 in the steering reaction torque signal generating device 200 according to the present embodiment may determine the target reaction torque based on the filtered rack force signal.

That is, the target reaction torque determiner 230 may determine the filtered rack force signal from which a cutoff band is removed from the estimated rack force, and, then may determine the corresponding target reaction torque value based on the filtered rack force signal.

The target reaction torque value corresponding to the filtered rack force signal may be determined by a specific tuning map.

The reaction torque signal generator 240 may generate a reaction torque signal corresponding to the determined target reaction torque.

The reaction torque signal is provided to the steering feedback actuator 320 or the reaction motor, and the feedback force, i.e., reaction force, is applied to the steering wheel by driving the reaction motor accordingly.

Meanwhile, the SBW steering system of the present embodiment may further include a brake pedal sensor 316, and only when the operation of the brake pedal is detected by the brake pedal sensor 316, the reaction torque signal generating device 200 may be activated.

Among the noises to be removed in the present embodiment, the judder noise is generated according to a change in braking force on a friction surface of a friction clutch or brake during braking.

Accordingly, the operation of the brake pedal is detected using the brake pedal sensor as described above, and the present embodiment may be applied only when the brake is operated, thereby removing the noise more precisely.

Figure 4:
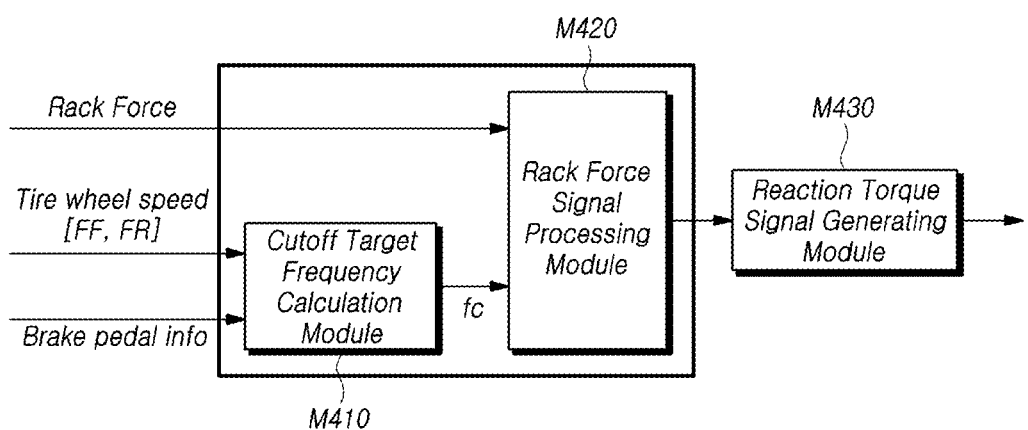
FIG. 4 illustrates a steering reaction torque generation principle according to the present embodiment.

FIG. 4 illustrates a steering reaction torque generation principle according to the present embodiment.

Referring to FIG. 4, the rotational speed information of the front and rear wheels of the vehicle and brake pedal information may be applied to the cutoff target frequency calculation module (M410), and the target frequency may be calculated according to a predetermined algorithm in the cutoff target frequency calculation module (M410). The calculated target frequency may be applied to the rack force signal processing module M420. For example, when the wheel rotation speed information calculated from information of a wheel rotation sensor or a vehicle speed sensor is applied, the cutoff target frequency calculation module may calculate the target frequency based on the applied information. As another example, the cutoff target frequency calculation module may calculate the target frequency based on wheel rotation speed information only when motion detection information of the brake pedal is applied from the brake pedal sensor.

Meanwhile, the rack force signal processing module M420 may pass the input or estimated rack force signal through an adaptive filter such as a notch filter determined according to the target frequency.

The filtered rack force signal may be output from the adaptive filter, and the filtered rack force signal may be input to the reaction torque signal generating module M430.

The reaction torque signal generating module M430 may determine the reaction torque value corresponding to the filtered rack force value according to a predetermined tuning map, and generate and output the reaction torque signal corresponding thereto.

The output reaction torque signal is transmitted to the reaction motor to apply the reaction force to the steering column.

As described above, according to the present embodiment, the filtered rack force signal may be generated except for a predetermined cutoff band including a target frequency corresponding to the rotational speed of the wheel, and the steering reaction torque signal may be generated based on the filtered rack force signal. Accordingly, it is possible to provide the steering wheel with a reaction torque from which unnecessary vibration components such as shimmy and judder are removed to improve the steering feeling of the SBW steering system.

The rack force signal used in an embodiment of the present disclosure may be based on the pinion gear of the vehicle steering system. Specifically, by using a state equations of calculated based on a first modeling analysis for a steering control device side not including the pinion gear and a second modeling analysis for a drive motor side including the pinion gear, at least one of the rack force, the estimated angle of the pinion gear and the estimated angular velocity of the pinion gear may be estimated.

Meanwhile, at least one of a final rack force, an estimated angle of the pinion gear and an estimated angular velocity of the pinion gear may be estimated by using a driving motor torque calculated based on the motor current, an angle estimation error of the pinion gear calculated by subtracting the estimated angle of the pinion gear from the angle of the pinion gear, and a column torque.

In this way, the rack force signal may be determined.

Meanwhile, when calculating the rack force signal, it has been assumed that the RWA device includes a driving motor, a power transmission mechanism such as a ball screw gear and a belt, and a mechanism part in which a pinion gear and a rack bar are further connected separately.

However, the calculation or estimation of the rack force signal is not limited to the above structure and method, and the rack force signal may be calculated according to another functional relationship using the steering torque and the motor torque of the driving motor as variables.

FIG. 5 illustrates an example of a rack force signal including a noise component according to the present embodiment, and FIG. 6 illustrates an example of a filtered rack force signal from which a cutoff band is removed according to the present embodiment.

In both FIGS. 5 and 6, the upper diagram illustrates a signal in the time domain and a signal in the frequency domain.

As shown in the upper diagram of FIG. 5, a typical rack force signal Frack may include a peak component Ni periodically at specific time ti in the time domain.

That is, the peak component generated for each $\Delta t$ nay become the shimmy noise or judder noise component related to the rotation of the wheel according to the present embodiment.

Such a noise component may be expressed as a peak component at a specific frequency in the frequency domain as shown in the lower diagram of FIG. 5, and this peak frequency may be the target frequency fc in the present embodiment.

That is, the target frequency fc of this embodiment may be the reciprocal of the period At at which the peak is generated in the upper diagram of FIG. 5. Accordingly, the target frequency may correspond to the number of rotation per second (rotational speed) of the wheel or a multiple thereof.

The rack force signal processor 220 according to the present embodiment may output the filtered rack force signal F'rack from which the cutoff band including the target frequency is removed.

As shown in FIG. 6, the filtering rack force signal F'rack is a signal from which a noise component (peak) of a specific band related to wheel rotation is removed as shown in FIG. 5.

Figure 7:
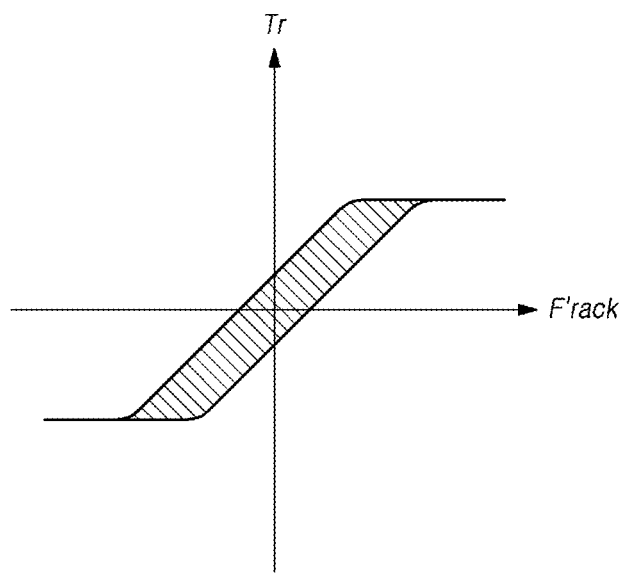
FIG. 7 illustrates an example of a mapping relationship between a filtering rack force signal and a target reaction torque according to the present embodiment.

FIG. 7 illustrates an example of a mapping relationship between a filtering rack force signal and a target reaction torque according to the present embodiment.

Referring to FIG. 7, there may be a specific proportional relationship between the filtered rack force signal F'rack and the target reaction torque Tr value, and a specific hysteresis may exist according to steering toward the rack end and steering return to the center.

In addition, since the target reaction torque Tr may have a specific saturation relationship. That is, the target reaction torque Tr may have a constant maximum value above the specific filtered rack force signal F'rack.

The relationship between the filtered rack force signal F'rack and the target reaction torque Tr is not limited to the example of FIG. 7, and may have a specific another relationship.

The relationship between the filtered rack force signal F'rack and the target reaction torque Tr may be defined as a tuning map as shown in FIG. 7, but is not limited thereto, and may also be defined in the form of a preset lookup table.

Figure 8:
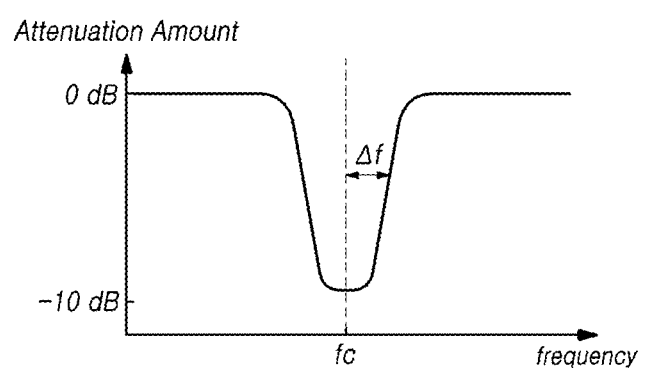
FIG. 8 illustrates an example of the filtering characteristics of a notch filter used in the rack force signal processor for generating a filtered rack force signal according to the present embodiment.

FIG. 8 illustrates an example of the filtering characteristics of a notch filter used in the rack force signal processor for generating a filtered rack force signal according to the present embodiment.

The rack force signal processor 220 according to the present embodiment may be implemented as a notch filter or an adaptive filter that attenuates only a signal of a predetermined cutoff band including the target frequency fc by a predetermined amount or more.

As shown in FIG. 8, this notch filter may be designed to have a specific margin frequency $\Delta f$ on both sides of the target frequency fc. In addition, the notch filter may be designed such that the attenuation rate at the target frequency fc is the largest, and the attenuation rate decreases toward both sides of the target frequency fc.

The notch filter may pass the signal exceeding the margin frequency $\Delta f$ on both sides of the target frequency fc as it is without attenuation.

As described above, the notch filter is used to remove a rack force component corresponding to a shimmy/judder noise component from a measured or estimated rack force signal.

In this case, as the margin frequency $\Delta f$ is increased, more shimmy/judder noise feeling may be removed, and the smaller the margin frequency is, the less noise is removed. Therefore, the margin frequency $\Delta f$ may be appropriately set as a tuning parameter according to the precision of the required reaction torque.

Accordingly, in the case that the frequency band of the noise component detected in the estimated rack force signal is large, the margin frequency may be set higher.

In addition, according to a selection of the driver, etc., the margin frequency may be set high in the quiet mode for minimizing the feeling caused by external influences, and conversely, may be set low in the dynamic mode for dynamically feeling the steering feeling caused by external influences.

Alternatively, after detecting vehicle vibration, the margin frequency may be set to be large in a driving environment in which the influence of vibration due to wheel rotation is large, such as an off-road environment, and a small margin frequency may be set in a stable driving environment such as highway driving.

Figure 10:
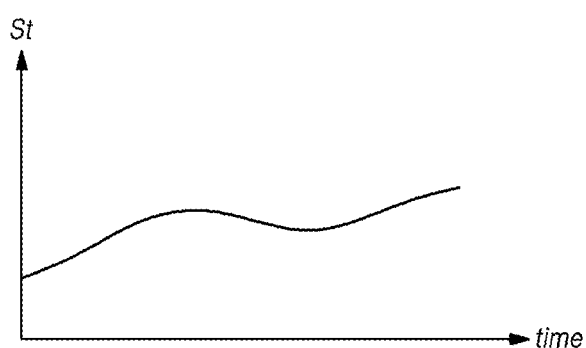
FIG. 10 illustrate an example of a reaction torque signal from which the shimmy and judder vibration components are removed by applying the present embodiment.

FIG. 10 illustrate an example of a reaction torque signal from which the shimmy and judder vibration components are removed by applying the present embodiment.

According to the above configuration, the reaction torque signal generator 240 may generates a reaction torque signal corresponding to the determined target reaction torque.

In the reaction torque signal St output at this time, as shown in FIG. 10, a noise component repeatedly included according to the wheel rotation speed may be removed.

As described above, according to the present embodiment, by dynamically setting the margin frequency of the notch filter used as the rack force signal processor according to the driving environment (mode) or the driver's selection, the reaction torque of the steering wheel can be controlled more precisely.

Meanwhile, the reaction torque signal generating device 200 according to the present embodiment as described above and the target frequency determiner 210, the rack force signal processor 220, the target reaction torque determiner 230, and the reaction torque signal generator 240 included therein may be implemented as a control device of the SBW steering system or a part of the ECU.

Such a control device or ECU of the SBW steering system may include a processor, a storage device such as a memory, and a computer program capable of performing a specific function. In addition, the target frequency determiner 210, the rack force signal processor 220, the target reaction torque determiner 230, and the reaction torque signal generator 240 may be implemented as a software module capable of performing each corresponding function.

That is, the target frequency determiner 210, the rack force signal processor 220, the target reaction torque determiner 230, and the reaction torque signal generator 240 as described above may be implemented as respective software modules and stored in a memory, and each software module may be executed at a specific time in an arithmetic processing device such as an ECU included in the SBW steering system.

Figure 9:
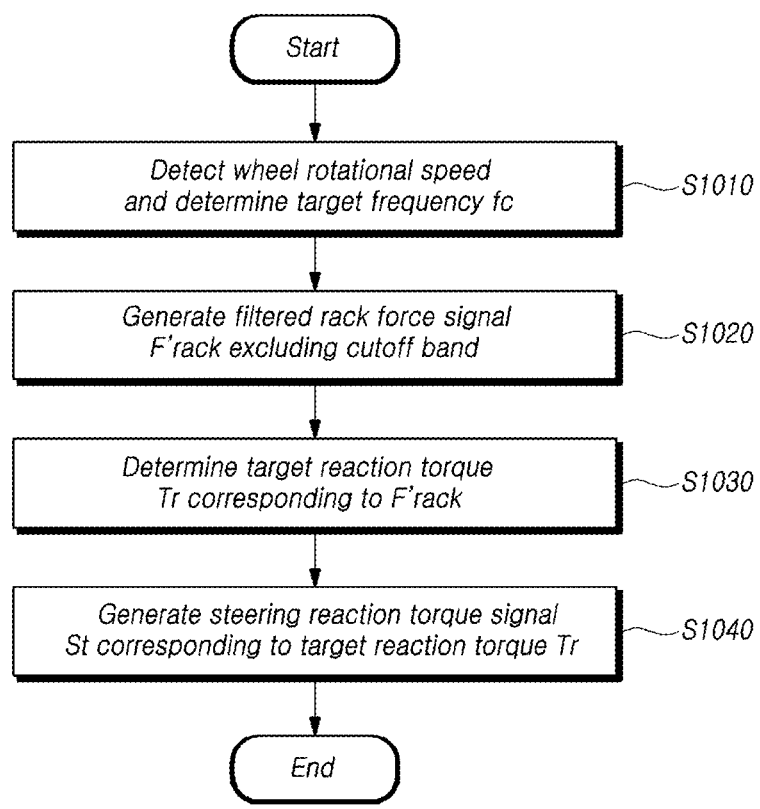
FIG. 9 is a flowchart illustrating a method for generating a steering reaction torque signal according to the present embodiment.

FIG. 9 is a flowchart illustrating a method for generating a steering reaction torque signal according to the present embodiment.

Referring to FIG. 9, the method for generating a steering reaction torque signal according to the present embodiment may include a step of determining a target frequency based on a rotational speed of a wheel (S1010), a step of generating a filtered rack force signal excluding a cutoff band including the target frequency from a rack force signal of the vehicle (S1020), a step of determining a target reaction torque based on the filtered rack force signal (S1030), and a step of generating a steering reaction torque signal based on the target reaction torque (S1040).

This method of generating a steering reaction torque signal of the SBW system may be performed by the steering reaction torque signal generating device described with reference to FIGS. 2 to 8, and detailed description will be omitted to avoid duplication.

Meanwhile, in this case, the target frequency may be determined as the number of rotation per second of the wheel or a multiple of the number. Alternatively, the target frequency may be determined as a value obtained by dividing a moving distance per second of the vehicle by (n x wheel diameter) or a multiple of the value.

In addition, only if a brake pedal operation is detected, the target frequency determination (S1010), the filtered rack force signal generation (S1020), the target reaction torque determination (S1030) and the steering reaction torque signal generation (S1040) may be performed.

As described above, according to the present embodiment, the filtered rack force signal may be generated except for a predetermined cutoff band including a target frequency corresponding to the rotational speed of the wheel, and the steering reaction torque signal may be generated based on the filtered rack force signal. Accordingly, it is possible to provide the steering wheel with a reaction torque from which unnecessary vibration components such as shimmy and judder are removed to improve the steering feeling of the SBW steering system.

It should be noted that although all or some of the configurations or elements included in one or more of the embodiments described above have been combined to constitute a single configuration or component or operated in combination, the present disclosure is not necessarily limited thereto. That is, within the scope of the object or spirit of the present disclosure, all or some of the configurations or elements included in the one or more of the embodiments may be combined to constitute one or more configurations or components or operated in such combined configuration(s) or component(s). Further, each of the configurations or elements included in one or more of the embodiments may be implemented by an independent hardware configuration; however, some or all of the configurations or elements may be selectively combined and implemented by one or more computer program(s) having one or more program module(s) that perform some or all functions from one or more combined hardware configuration(s). Codes or code segments constituting the computer program(s) may be easily produced by those skilled in the art. As the computer programs stored in computer-readable media are read and executed by a computer, embodiments of the present disclosure can be implemented. The media for storing computer programs may include, for example, a magnetic storing medium, an optical recording medium, and a carrier wave medium.

Further, unless otherwise specified herein, terms 'include', 'comprise', 'constitute', 'have', and the like described herein mean that one or more other configurations or elements may be further included in a corresponding configuration or element. Unless otherwise defined herein, all the terms used herein including technical and scientific terms have the same meaning as those understood by those skilled in the art. The terms generally used such as those defined in dictionaries should be construed as being the same as the meanings in the context of the related art and should not be construed as being ideal or excessively formal meanings, unless otherwise defined herein.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A device for generating a steering reaction torque signal in a steer-by-wire steering system of a vehicle, the device comprising:
   a target frequency determiner for determining a target frequency based on a rotational speed of a wheel when the vehicle is at a moving state, the target frequency being determined as (i) the number of rotation per second of the wheel or a multiple of the number or (ii) a value obtained by dividing a moving distance per second of the vehicle by ($\pi \times$wheel diameter) or a multiple of the value;
   a rack force signal processor for generating a filtered rack force signal excluding a cutoff band including the target frequency from a rack force signal of the vehicle, the rack force signal being determined based on a steering torque applied to a steering column of the vehicle;
   a target reaction torque determiner for determining a target reaction torque based on the filtered rack force signal; and
   a reaction torque signal generator for generating a steering reaction torque signal based on the target reaction torque,
   wherein
   the rack force signal processor is configured to generate the filtered rack force signal excluding the cutoff band using a notch filter set to have a specific margin frequency on both sides of the target frequency, and
   the specific margin frequency is differently set depending on a driving environment or a driving mode of the vehicle.

2. The device of claim 1, wherein the target frequency determination, the filtered rack force signal generation, the target reaction torque determination and the steering reaction torque signal generation are performed only if a brake pedal operation is detected.

3. The device of claim 1, wherein the rack force signal is further determined based on a motor torque of a driving motor for moving a rack bar of the steer-by-wire steering system.

4. The device of claim 1, wherein
   the driving mode of the vehicle is selectable by a driver of the vehicle and includes a quiet mode and a dynamic mode,
   the specific margin frequency is set to a first specific margin frequency in response to a driver's selection of the quiet mode, and
   the specific margin frequency is set to a second specific margin frequency in response to a driver's selection of the dynamic mode, the first specific margin frequency being higher in the quiet mode than the second specific margin frequency.

5. The device of claim 1, wherein
the specific margin frequency is set to a first specific margin frequency in response to detecting that the vehicle travels in an off-road environment, and
the specific margin frequency is set to a second specific margin frequency in response to detecting that the vehicle travels in a stable driving environment, the first specific margin frequency being larger than the second specific margin frequency.

6. A steer-by-wire steering system of a vehicle, the steer-by-wire steering system comprising:
a wheel rotation sensor for detecting a rotational speed of a wheel;
a reaction torque signal generating device configured to
determine a target frequency based on the rotational speed of the wheel when the vehicle is at a moving state, the target frequency is determined as (i) the number of rotation per second of the wheel or a multiple of the number or (ii) a value obtained by dividing a moving distance per second of the vehicle by ($\pi \times$wheel diameter) or a multiple of the value,
generate a filtered rack force signal excluding a cutoff band including the target frequency from a rack force signal, the rack force signal being determined based on a steering torque applied to a steering column of the vehicle, and
generate a steering reaction torque signal according to a target reaction torque determined based on the filtered rack force signal; and
a steering feedback actuator for providing a reaction torque to a steering wheel according to the steering reaction torque signal,
wherein
the reaction torque signal generating device is configured to generate the filtered rack force signal excluding the cutoff band using a notch filter set to have a specific margin frequency on both sides of the target frequency, and
the specific margin frequency is differently set depending on a driving environment or a driving mode of the vehicle.

7. The steer-by-wire steering system of claim 6, further comprising a brake pedal sensor detecting a brake pedal operation of the vehicle,
wherein the reaction torque signal generating device is activated only if the brake pedal operation is detected by the brake pedal sensor.

8. The steer-by-wire steering system of claim 6, wherein the rack force signal is further determined based on a motor torque of a driving motor for moving a rack bar of the steer-by-wire steering system.

9. A method for generating a steering reaction torque signal in a steer-by-wire steering system of a vehicle, the method comprising:
determining a target frequency based on a rotational speed of a wheel when the vehicle is at a moving state, the target frequency is determined as (i) the number of rotation per second of the wheel or a multiple of the number or (ii) a value obtained by dividing a moving distance per second of the vehicle by ($\pi \times$wheel diameter) or a multiple of the value;
generating a filtered rack force signal excluding a cutoff band including the target frequency from a rack force signal of the vehicle, the rack force signal being determined based on a steering torque applied to a steering column of the vehicle;
determining a target reaction torque based on the filtered rack force signal; and
generating a steering reaction torque signal based on the target reaction torque,
wherein
the generating of the filtered rack force signal rack force signal comprises generating the filtered rack force signal excluding the cutoff band using a notch filter set to have a specific margin frequency on both sides of the target frequency, and
the specific margin frequency is differently set depending on a driving environment or a driving mode of the vehicle.

10. The method of claim 9, wherein the target frequency determination, the filtered rack force signal generation, the target reaction torque determination and the steering reaction torque signal generation are performed only if a brake pedal operation is detected.

11. The method of claim 9, wherein the rack force signal is further determined based on a motor torque of a driving motor for moving a rack bar of the steer-by-wire steering system.

* * * * *